US011162873B2

(12) United States Patent
Kraus et al.

(10) Patent No.: US 11,162,873 B2
(45) Date of Patent: Nov. 2, 2021

(54) TIRE PROCESSING METHOD

(71) Applicant: 4JET TECHNOLOGIES GMBH, Alsdorf (DE)

(72) Inventors: Armin Kraus, Herzogenrath (DE); Jörg Jetter, Aachen (DE); André Lange, Aachen (DE)

(73) Assignee: 4JET TECHNOLOGIES GMBH, Alsdorf (DE)

( * ) Notice: Subject to any disclaimer, the term of this patent is extended or adjusted under 35 U.S.C. 154(b) by 594 days.

(21) Appl. No.: 15/673,100

(22) Filed: Aug. 9, 2017

(65) Prior Publication Data

US 2018/0045611 A1 Feb. 15, 2018

(30) Foreign Application Priority Data

Aug. 10, 2016 (EP) ..................... 16183628

(51) Int. Cl.
*B29D 30/00* (2006.01)
*B60C 23/04* (2006.01)
(Continued)

(52) U.S. Cl.
CPC ....... *G01M 17/024* (2013.01); *B29D 30/0016* (2013.01); *B60C 23/0493* (2013.01); *B29D 2030/0011* (2013.01); *B29D 2030/0022* (2013.01); *B29D 2030/0077* (2013.01); *B29D 2030/0635* (2013.01); *B29D 2030/728* (2013.01)

(58) Field of Classification Search
CPC ........ B29D 30/0061; B29D 2030/0083; B60C 23/0491; G01M 17/024
See application file for complete search history.

(56) References Cited

U.S. PATENT DOCUMENTS 7,295,948 B2  11/2007 Jetter
8,442,670 B2*  5/2013 Chebli .................. B29C 73/26
                                            264/334
(Continued)

FOREIGN PATENT DOCUMENTS

CH       453 140 A    5/1968
EP    1 604 809 A1   12/2005
(Continued)

OTHER PUBLICATIONS

Google translation of JP-4205274-B2 (Year: 2020).*
(Continued)

*Primary Examiner* — Katelyn W Smith
*Assistant Examiner* — Alexander D Booth
(74) *Attorney, Agent, or Firm* — Lewis Roca Rothgerber Christie LLP

(57) ABSTRACT

A tire comprises an inner surface defining and facing an inner hollow space, an outer surface pointing away from the inner hollow space. A method of processing the tire comprises identifying the position of a first feature on the outer surface and cleaning a surface portion of the inner surface of the tire, wherein the surface portion has a first predetermined position relative to the position of the first feature on the outer surface. A separate element is attached with its attachment surface to the surface portion, wherein a ratio of a size of the surface portion over a corresponding size of the attachment surface is smaller than 10.

13 Claims, 2 Drawing Sheets

(51) Int. Cl.
   *B29D 30/72*   (2006.01)
   *G01M 17/02*   (2006.01)
   *B29D 30/06*   (2006.01)

(56) References Cited

U.S. PATENT DOCUMENTS

| | | | | |
|---|---|---|---|---|
| 2005/0274448 | A1* | 12/2005 | Lettieri | B08B 13/00 |
| | | | | 156/110.1 |
| 2006/0071767 | A1* | 4/2006 | Johanning | B60C 3/06 |
| | | | | 340/447 |
| 2006/0151451 | A1* | 7/2006 | Smith, Jr. | B29D 30/72 |
| | | | | 219/121.68 |
| 2007/0127808 | A1* | 6/2007 | Daniel, Jr. | B29D 30/0061 |
| | | | | 382/152 |
| 2007/0175554 | A1 | 8/2007 | Bertrand | |
| 2008/0246588 | A1* | 10/2008 | Shimura | B60C 23/0479 |
| | | | | 340/10.1 |
| 2008/0303674 | A1* | 12/2008 | Hara | B60C 23/0493 |
| | | | | 340/572.8 |
| 2009/0229737 | A1* | 9/2009 | Fujiwara | B29C 73/10 |
| | | | | 156/97 |
| 2010/0243127 | A1* | 9/2010 | Chebli | B29D 30/0005 |
| | | | | 156/64 |
| 2014/0352420 | A1* | 12/2014 | Brusarosco | B60C 23/0493 |
| | | | | 73/146.5 |
| 2014/0355648 | A1* | 12/2014 | Brusarosco | B60C 23/0493 |
| | | | | 374/143 |
| 2016/0311274 | A1* | 10/2016 | Tanno | B60C 23/0493 |
| 2018/0318888 | A1* | 11/2018 | Matsumura | B08B 7/0042 |

FOREIGN PATENT DOCUMENTS

| | | | |
|---|---|---|---|
| EP | 2 433 786 A2 | 3/2012 | |
| EP | 2 599 647 A1 | 6/2013 | |
| EP | 2 777 958 A1 | 9/2014 | |
| EP | 2777958 A1 * | 9/2014 | B60C 5/14 |
| EP | 2 873 540 A1 | 5/2015 | |
| EP | 2 905 125 A1 | 8/2015 | |
| EP | 2 977 934 A1 | 1/2016 | |
| EP | 3 095 596 A1 | 11/2016 | |
| EP | 3 147 114 A1 | 3/2017 | |
| EP | 3 219 478 A1 | 9/2017 | |
| JP | 4205274 B2 * | 1/2009 | B60C 23/0493 |
| JP | 2012240603 A * | 12/2012 | B60C 23/0493 |
| WO | WO 02/092364 A2 | 11/2002 | |
| WO | WO 2004/098910 A2 | 11/2004 | |
| WO | WO 2009/070146 A1 | 6/2009 | |
| WO | WO-2015083726 A1 * | 6/2015 | B60C 23/20 |

OTHER PUBLICATIONS

ESpaceNet Translation of WO2015083726 (Year: 2021).*
ESpaceNet Translation of JP2012240603 (Year: 2021).*
Extended European Search Report dated Jan. 27, 2017 for corresponding European Application No. 16183628.3, 10pp.

* cited by examiner

TIRE PROCESSING METHOD

This application claims priority of the pending European patent application No. 16 183 628.3 filed on 10 Aug. 2016. This patent application is incorporated herein by reference in its entirety to provide continuity of disclosure.

FIELD OF INVENTION

The present invention relates to the field of processing a tire.

BACKGROUND

EP 2599647 A1 discloses a method comprising providing a green tire and an enveloping member, simultaneously curing the enveloping member to an innerliner of the green tire such that at least one edge or side and at least a part of the interior of the cured enveloping member is not attached to the cured innerliner thereby forming a pocket or a bridge structure, and inserting an item into the pocket or under the bridge structure by moving the item in a first direction through a mouth defined by the at least one unattached end or side of the cured enveloping member and an adjacent portion of the cured innerliner. The items may be wireless pressure sensors, accelerometer, RFID's, pressure regulators, and/or modules and also balancing weights, foam for noise/vibration reduction, etc. Conventional methods typically involved gluing the sensors or other components to an innerliner, which necessitates preparation of the innerliner surface prior to applying the glue (e.g., cleaning by buffing or cleaning by chemicals or by laser/plasma, etc.).

U.S. Pat. No. 7,295,948 B2 discloses a single station system in which the following steps are processed one after another: conveying of the tire; centering below a swivel arm scanning the sidewall; selecting a marking spot; laser engraving; verifying the marking. Further described is a multistation system in which a tire is continuously transported through the system without slip by the conveyor belt where a rotational axis of the swivel arm is kept collinear with the tire's center. Further described is the laser station being shielded by protective walls and automatic doors, to confine stray radiation or odorous fumes and vapors.

SUMMARY

In view of the above-described situation, there still exists a need for an improved technique that enables to process a tire in an efficient manner.

This need may be met by the subject matter according to the independent claims. Advantageous embodiments of the herein disclosed subject matter are described by the dependent claims.

According to an embodiment of a first aspect of the herein disclosed subject matter there is provided a method of processing a tire, the tire comprising an inner surface defining and facing an inner hollow space, an outer surface pointing away from the inner hollow space, the method comprising: identifying the position of a first feature on the outer surface and cleaning a surface portion of the inner surface of the tire, the surface portion having a first predetermined position relative to the position of the first feature on the outer surface.

According to an embodiment of a second aspect of the herein disclosed subject matter there is provided a computer program product comprising a program element, the program element being adapted for, when executed on a processor device, performing the method according to the first aspect or an embodiment thereof.

According to an embodiment of a third aspect of the herein disclosed subject matter there is provided a tire processing device being configured for performing the method according to the first aspect or an embodiment thereof.

According to an embodiment of a fourth aspect of the herein disclosed subject matter there is provided a tire comprising: an inner surface defining and facing an inner hollow space of the tire; an outer surface pointing away from the inner hollow space; a feature on the outer surface, the feature being optically visible; a surface portion of the inner surface of the tire in which the inner surface is cleaned, the surface portion having a predetermined position relative to the feature on the outer surface; and a separate element with an attachment surface, the attachment surface and the surface portion being attached to each other; wherein a ratio of a size of the surface portion over a size of the attachment surface is smaller than 10, preferably smaller than 1.2.

According to an embodiment of a fifth aspect of the herein disclosed subject matter there is provided a batch of tires, wherein each tire of the batch comprises an inner surface defining and facing an inner hollow space of the tire; an outer surface pointing away from the inner hollow space; a feature on the outer surface, the feature being optically visible; and a (cleaned) surface portion of the inner surface of the tire in which the inner surface is cleaned, the surface portion having a predetermined position relative to the feature on the outer surface; wherein among the tires of the batch an angular position of the (cleaned) surface portion with respect to the feature is within an angular range of +−20 degrees, wherein the angular position is defined with respect to an axis of rotation of the tire.

DESCRIPTION OF EXEMPLARY EMBODIMENTS

In the following, exemplary embodiments of the herein disclosed subject matter are described, any number and any combination of which may be realized in an implementation of aspects of the herein disclosed subject matter.

According to embodiments of the first aspect, the method is adapted for providing the functionality or features of one or more of the herein disclosed embodiments and/or for providing the functionality or features as required by one or more of the herein disclosed embodiments, in particular of the embodiments of the second, third, fourth and fifth aspect disclosed herein.

According to embodiments of the second aspect, the computer program product is adapted for providing the functionality or features of one or more of the herein disclosed embodiments and/or for providing the functionality or features as required by one or more of the herein disclosed embodiments, in particular of the embodiments of the first, third, fourth and fifth aspect disclosed herein.

According to embodiments of the third aspect, the tire processing device is adapted for providing the functionality or features of one or more of the herein disclosed embodiments and/or for providing the functionality or features as required by one or more of the herein disclosed embodiments, in particular of the embodiments of the first, second, fourth and fifth aspect disclosed herein.

According to embodiments of the fourth aspect, the tire is adapted for providing the functionality or features of one or more of the herein disclosed embodiments and/or for providing the functionality or features as required by one or more of the herein disclosed embodiments, in particular of the embodiments of the first, second, third and fifth aspect disclosed herein.

According to embodiments of the fifth aspect, each tire of the batch of tires is adapted for providing the functionality or features of one or more of the herein disclosed embodiments and/or for providing the functionality or features as required by one or more of the herein disclosed embodiments, in particular of the embodiments of the first, second, third and fourth aspect disclosed herein.

Attachment of a separate element (e.g. a device, in particular an electrical device) on a surface portion of the inner surface of a tire requires cleaning of the inner surface portion of the tire. By cleaning only the surface portion of the inner surface of a tire, the efficiency of the processing of the tire is increased. Attaching the separate element at the first predetermined position relative to the position of the (first) feature on an outer surface of the tire has the advantage that the position of the separate element on the inner surface of the tire can be derived from the position of the first feature on the outer surface of the tire. Further functional advantage may be achieved depending on the type of the first feature.

In accordance with an embodiment, an identification of the first predetermined position of the surface portion is performed by identifying the position of the first feature on the outer surface and a knowledge of a predetermined spatial relationship between the position of the first feature and a desired position of the surface portion on the inner surface of the tire. According to an embodiment, this predetermined spatial relationship includes a radial position and an angular position on the tire.

The knowledge of the predetermined spatial relationship between the position of the first feature and the position of the surface portion may be provided in the form of spatial relationship data which may e.g. be inputted by a user. According to a further embodiment, the spatial relationship data may be retrieved from a storage device. Retrieval from a storage device may include receiving a specification of the tire (e.g. from a sensor or as a user input) and selecting the spatial relationship data which correspond to the specification of the tire.

According to an embodiment, a tire processing device comprises at least one transport device for the transporting the tire and a cleaning device for cleaning the surface portion. According to an embodiment, the cleaning device comprises a processing head, in particular a movable processing head. According to an embodiment, the cleaning device is a laser device which is configurable for cleaning of tire surfaces (or, more generally, of rubber surfaces). Accordingly, in an embodiment the cleaning of the surface portion is performed with a laser beam.

According to an embodiment, cleaning of the surface portion involves positioning of the tire and the processing head with respect to each other. According to an embodiment, the positioning of the tire and the processing head is performed only prior to the cleaning of the surface portion. According to a further embodiment the positioning of the tire and the processing head is performed prior and/or during the cleaning of the surface portion.

For example, the processing head of the cleaning device (e.g. a laser device) may be configured for being adjustable with respect to a coordinate system of the cleaning device so as to move the processing head for cleaning the surface portion. Further, according to an embodiment the tire is movable (e.g. by a transport device or by a positioning device) with respect to the cleaning device (in particular with respect to the coordinate system of the cleaning device). For example, positioning the processing head (and/or a laser beam of the laser device) with respect to the surface portion of the inner surface of the tire may include (or may consist of) positioning the tire (thereby positioning the first feature and the surface portion of the tire) into a desired spatial relationship with respect to the coordinate system of the cleaning device. In accordance with respective embodiments this desired spatial relationship includes a lateral position and an angular position of the tire (position of the tire regarding a rotation of the tire about its tire axis).

For example, according to an embodiment the axis of rotation of the tire is aligned with a z-axis of the coordinate system of the processing device and the processing head is rotated about the z-axis depending on the angular position of the first feature in order to position the processing head with respect to the first feature and to allow cleaning the surface portion of the inner surface by the processing head depending on the angular position of the first feature.

According to an embodiment the processing head is moveable in radial direction in order to allow cleaning of the surface portion depending on the (desired) radial position of the surface portion. If the cleaning device is a laser device, instead of or in addition to being moveable in radial direction the processing head may be pivotable so as to shift the processing region of the cleaning device (e.g. the laser spot in case of a laser device) in radial direction. In particular for a laser device moving the processing region of the cleaning device in radial direction may also be accomplished by the optical system (e.g. by a scanner) of the laser device. According to an embodiment, moving the processing region of the laser device in angular (circumferential) direction during cleaning is performed by the optical system of the laser device.

In particular if the processing region of the cleaning device is smaller than the surface portion, a movement of the processing region over the surface portion is necessary in order to clean the surface portion. Such a movement of the processing region over the surface portion during the cleaning may be performed by any movement of the processing region and the tire with respect to each other and may be performed by movements of the processing head as described above.

According to embodiments of the herein disclosed subject matter, the identifying of the position of the first feature and/or the positioning of the tire and the tire processing head/cleaning device with respect to each other may be performed in any degree of detail described in one or more of the following European Patent Applications: European Patent Application No. 15 186 739.7; European Patent Application No. 16 161 235.3; European Patent Application No. 15 168 748.0; European Patent Application No. 14 177 901.7; European Patent Application No. 14 154 445.2.

For example, according to an embodiment the positioning of the tire with respect to the cleaning device includes a rotation of the tire with respect to the tire axis of rotation (in the following also referred to as "tire axis"). According to an embodiment, the tire processing device includes a positioning device for positioning a (first) tire with respect to the laser device into a cleaning position (or, more generally, into a treatment position) to allow the cleaning of the surface portion of the first tire with the cleaning device.

The tire processing device may include one or more further positioning devices (e.g. transport devices), e.g. an intermediate transport supply device which is configured for providing a further (second) tire to the tire positioning device. According to an embodiment, a positioning device in the form of a centering device is provided which is configured for centering the tire with regard to a transport device (e.g. a conveyor). According to an embodiment, the intermediate transport supply device may also include one or more positioning elements, e.g. a pre-centering device.

According to an embodiment, the positioning device may comprise a single positioning element or, in another embodiment may comprise two or more positioning elements. For example, according to an embodiment the positioning device comprises as a first positioning element a conveyor for positioning a tire in a conveying direction and a second positioning element, e.g. a centering device such as a centering clamp, for positioning the tire crosswise, e.g. perpendicular, to the conveying direction.

According to a further embodiment, a control device is provided for operating in the transport devices and the cleaning device. The control device may be a single device controlling all or part of the operations of the tire processing device. According to another embodiment, the control device may include two or more individual controllers which may be configured for operating independently from each other or which may be, in another embodiment, communicatively coupled for coordinating the operation of the individual controllers.

The control device being configured for operating the intermediate transport supply device and the positioning device in order to move the second tire to the cleaning position and simultaneously remove the first tire from the treatment cleaning position.

The identifying of the position of the first feature and the subsequent cleaning of the surface portion does not necessarily require maintaining the tire in a fixed location. For example, according to an embodiment the tire processing device comprises a reading section and a cleaning section, wherein the reading section is configured for identifying the position of the first feature on the outer surface and the cleaning section is configured for cleaning the surface portion on the inner surface. Of course this requires that the tire is handed over from the reading section to the cleaning section in a well-defined way, i.e. such that the position of the tire in the cleaning section is known from the data provided by the reading section and transfer data which describe the transfer of the tire from the reading section to the cleaning section (tracing of the position of the first feature (or of the tire)). In another embodiment, the position of the tire is determined in the cleaning section or is confirmed in the cleaning section and wherein the tire is not moved during determining/confirming the position of the tire and the cleaning of the surface portion.

According to a further embodiment, for identifying the position of the first feature a sensor is provided, e.g. a sheet of light sensor or a camera (e.g. a 3D camera). According to an embodiment, the sensor is configured for determining a profile of a flank of the tire. Hence, according to an embodiment identifying the position of the first feature on the outer surface is performed by means of a light sheet sensor. According to another embodiment identifying the position of the first feature on the outer surface is performed by means of a camera.

According to an embodiment, during identifying the sensor and the tire are rotated with respect to each other. For example, according to an embodiment the sensor is rotated with respect to the tire, e.g. about the tire axis. According to another embodiment, the tire is rotated with respect to the sensor, e.g. about the tire axis. Rotating the sensor and the tire with respect to each other may be helpful or necessary, depending on the sensor type.

According to an embodiment, the method further comprises engraving (in particular, in an embodiment, laser engraving) of a second feature on the outer surface at a second predetermined position relative to the position of the first feature on the outer surface. For example, the second feature may indicate the position of the surface portion on the outer surface of the tire. According to an embodiment, the engraving of the second feature on the outer surface is performed in the same station in which the cleaning is performed, preferably without moving and without again identifying the position of the first feature. For example, according to an embodiment the cleaning and the (laser) engraving of the second feature is performed with the same laser device (although different laser parameters may be used for cleaning and engraving).

According to an embodiment, the second predetermined position is different from an excluded position, e.g. a tire uniformity point. For example, according to an embodiment an excluded position (such as the tire uniformity point) is defined for the tire and the second predetermined position is specified so as to be different from the excluded position. For example, two alternative positions (e.g. a first alternative position and a second alternative position) may be stored in a memory of the tire processing device as available second predetermined positions. According to an embodiment, the tire processing device (or a control device thereof) may be configured for selecting the first alternative position as a first option. Further, the tire processing device (or a control device thereof) may be configured to select the second alternative position (as a second option) if the first alternative position corresponds to or overlaps with the excluded position.

According to an embodiment, the method further comprises attaching a separate element to the surface portion after cleaning the surface portion. For example, according to an embodiment the separate element comprises a device, e.g. an electrical device, such as a sensor, a radiofrequency device (such as a radiofrequency identification (RFID) tag), a generator for electrical energy, etc. According to another embodiment the separate element comprises a passive element. Any such embodiment results in a tire which has a separate element attached to the surface portion of the inner surface of the tire, wherein the surface portion has a first predetermined position relative to the position of the first feature on the outer surface. According to an embodiment, the separate element comprises an electrical device which is located in a rubber envelope wherein the rubber envelope comprises the attachment surface.

According to an embodiment, the surface portion is located opposite the tread surface of the tire.

According to an embodiment, the attaching of the separate element to the surface portion is performed in a further station of the tire processing device. According to an embodiment, a transfer of the tire to the further station is performed in a way that the position of the tire in the further station is known from initial position information (e.g. available from identifying the position of the first feature before the cleaning of the surface portion (i.e. in an initial position)) and transport information (e.g. information about the length of the transport path from the initial position to the position of the tire in the further station). According to a further embodiment, in the further station the position of the tire is again determined, by identifying a further position of the first feature in the further station.

According to an embodiment, the electrical device comprises a readable device serial number and the method further comprises: reading the device serial number of the electrical device; reading tire related information from the tire (e.g. by a sheet of light sensor, a camera, a barcode sensor, etc.) and/or from a further data source (e.g. an database); storing a data record on a storage device, the data record associating the device serial number and the tire related information. According to an embodiment, the storage device is a storage device of the electrical device. According to another embodiment, the storage device is a storage device of a remote device, e.g. of a network node of a communication network. For example, according to an embodiment the remote device is a server computer.

According to an embodiment, wherein the second feature and the surface portion are provided on opposing sides of a common part of the tire. According to a further embodiment, the second feature and the surface portion are provided in the same angular position of the tire. This has the advantage that the location of the surface portion is directly indicated by the second feature on the outer surface of the tire. For example, if an electronic device is attached to the surface portion the location of the electronic device is indicated ("made visible") by the second feature on the outer surface of the tire. According to a further embodiment, the second feature is a device marking. According to an embodiment, the storage device is part of the electrical device being attached on the inner surface of the tire and the tire related information comprises a tire serial number and/or a production week (weekly code) of the tire.

According to an embodiment, the weekly code is read from the weekly code marking on the tire according to an embodiment by a sheet of light sensor. Further, in particular in such an embodiment, the method may further comprise storing the weekly code of the tire in the storage device of the electrical device. According to another embodiment, the weekly code is laser engraved on the tire as the second feature according to a further embodiment after the content of the weekly code is retrieved from a database depending on the serial number of the tire.

According to an embodiment, identifying the position of the first feature or any other feature of the tire is performed only once. As described above, according to an embodiment the position of the tire is traced even if the tire is moved after identifying the position of the first feature and before cleaning the surface portion, before marking the second feature and/or before attaching the separate element. Identifying the position of the first feature only once may reduce the cycle time for the treatment of a single tire.

According to a further embodiment, identifying the position of any of the first or the second feature on the outer surface is performed exactly twice. According to a further embodiment, identifying the position of any of the first or the second feature on the outer surface is performed at most twice. According to a further embodiment, identifying the position of any of the first or the second feature on the outer surface is performed exactly three times. According to a further embodiment, identifying the position of any of the first or the second feature on the outer surface is performed at most three times. According to a further embodiment, identifying the position of any of the first or the second feature on the outer surface is performed exactly four times. According to a further embodiment, identifying the position of any of the first or the second feature on the outer surface is performed at most four times.

The more often the position of the first feature and/or of the second feature is identified (i.e. the more often the identification of the position of the first feature and/or of the second feature is performed), the more accurate may be the position information which results from the identification. However, it should be understood that usually each identification of the position of the first feature requires a certain processing time which adds to the cycle time for the processing of the tire. On the other hand, subsequent performance of process steps in different locations (stations) of the tire processing device may require additional identification (additional over a single identification), e.g. if the position of the tire is not traceable.

According to an embodiment, for identifying the position of the first feature (and/or of the second feature) for the second time a different method for identifying the position may be used. For example, if the position of the first feature is determined (for the first time) in a first station with a sheet of light sensor, in a second station the position of the first feature may be determined by a camera which acquires a picture of at least part of the tire, wherein the at least part of the tire includes the first feature.

According to an embodiment, the method comprises as further processing steps the attaching of the separate element ("attaching") and/or the engraving of the second feature ("engraving"). According to a further embodiment, at least one of the further processing steps attaching and engraving comprises (a) identifying the position of a third feature (or two or more third features) on the outer surface of the tire and (b) performing the at least one further processing step depending on a position of the at third feature. According to an embodiment, the third feature is different from the first feature. According to a further embodiment, the third feature is the first feature. According to a further embodiment, the identifying of the position of the third feature is performed after the cleaning of the surface portion. According to an embodiment, the identifying of the third feature (or two or more third features) is performed after transporting the tire to a further station which is different from the station in which the cleaning has been performed.

According to an embodiment, the predetermined position of the surface portion relative to the feature is subject to tolerances (e.g. tolerances in identifying the position of the first feature, positioning tolerances e.g. of the tire, the cleaning device, etc.). According to respective embodiments, with respect to an axis of rotation of the tire an angular position of the surface portion is defined with an accuracy of +−20 degrees, in particular with an accuracy of +−10 degrees, with an accuracy of +−5 degrees, or with an accuracy of +−2 degrees. Depending on the application, a specific accuracy may be sufficient, depending e.g. on the type of the separate element to be attached to the surface portion. The accuracy specified above in different embodiments is achieved over a plurality of tires processed with the tire processing device, e.g. over a batch of tires. Hence, when performing a method according to embodiments of the herein disclosed subject matter the actual position of the (cleaned) surface portion on the inner surface of the tire is within an angular range which is defined by the first predetermined position relative to the first feature+−the accuracy value specified in the respective embodiment. Hence, e.g. within the batch of tires the angular position of the surface portion with respect to the feature is within the specified accuracy (e.g. according to an aforementioned embodiment), e.g. an angular range of +−20 degrees (or, in other embodiments +−10 degrees, +−5 degrees, or +−2 degrees, as described above). According to an embodiment, the surface portion being within the specified angular range (with the specified accuracy in the angular position) is still considered as being in the (first) predetermined position relative to the position of the first feature. It is noted that the radial position of the surface portion is as well subject to tolerances and is therefore also specified only within a certain radial range (of e.g. +−10% (or, in other embodiments, +−5%, +−2%) of the rated distance from the tire axis of rotation). According to an embodiment, the surface portion being with the specified radial range (with the specified accuracy in the radial position) is still considered as being in the (first) predetermined position relative to the position of the first feature.

According to an embodiment, the batch is a fabrication batch of rubber tires. According to other embodiments, the batch is a number of tires with a same identification, e.g. within a weekly production (e.g. a number of tires having the same DOT code and/or tires manufactured in a specific curing mold (curing batch)), within a monthly production or within an annual production, etc. According to a further embodiment, the batch is a subset of a number of tires identified above (e.g. a subset of tires with the same DOT week code) wherein the subset has been equipped with specific properties (such as an emergency operation property of a tire which causes small defects in the tire to be repaired automatically by a suitable inner layer in the tire).

According to an embodiment, the first feature on the outer surface comprises at least one visible element, e.g. a digital data element (e.g. a barcode, a QR code, etc.), an analog element (e.g. a DOT code, a marking, a tire uniformity point). For example, if the first feature is a tire uniformity point and the separate element is attached diametrically opposite the tire uniformity point, an imbalance of the tire may be reduced. It should be understood that in such a case predetermined position is diametrically opposite the first feature.

Generally the surface portion extends over an area of the inner surface of the tire (also referred to as the extent of the surface portion) which is equal to or larger than the area of the surface portion itself. According to an embodiment, the surface portion comprises two surface parts which are spaced from each other by a part of an uncleaned surface (also referred to as uncleaned surface parts). The surface parts which are spaced from each other may be connected by a further surface part of the surface portion or, in another embodiment, may be isolated from each other (i.e. they may form individual surface parts). It should be understood that this includes, if the surface portion is not cleaned yet, that the parts of the surface portion, which are to be cleaned, are separated by part of the surface which is not to be cleaned. While it is understood that the area over which the surface portion extends may be defined in different ways, one way of defining this area is that a boundary (also referred to as extent boundary) of the area is defined by an outermost boundary of the surface portion (also referred to as portion boundary) and, where two parts of the surface portion are separated by an uncleaned surface part, by the tangent between the separated parts of the surface portion. According to an embodiment, the extent boundary has the shape of a rectangle. According to a further embodiment, the shape of the extent boundary is a circle, an ellipse or any other geometrical shape that can be described with a reasonable set of parameters.

According to an embodiment, the area of the surface portion itself is at least 20% of the area over which the surface portion extends. According to a further embodiment, the area of the surface portion itself is at least 30% (or, in respective other embodiments, at least 40%, at least 50%, at least 60%, at least 70%, at least 80% or at least 90%) of the area over which the surface portion extends. for example, the surface portion may have the shape of a pattern, e.g. a line pattern, a dot pattern, etc., wherein the lines or dots are separated from each other. A line pattern may consist of a number of parallel lines each of which forms a part of the surface portion and which are separated by parts of the uncleaned surface. According to a further embodiment, the surface portion has the shape of a path on that consists of crossing lines wherein between the crossing points the lines are separated by parts of the uncleaned surface.

According to another embodiment, the area of the surface portion itself is equal to the area over which the surface portion extends, e.g. if the surface portion is a continuous surface portion and includes only straight or convex boundaries.

According to an embodiment, the separate element (which is attached to the cleaned surface portion) comprises an attachment surface by which the separate element is attached to the surface portion of the inner surface of the tire. According to an embodiment, a size of the surface portion is not larger than 10 times of a size of the attachment surface of the separate element. According to a further embodiment, the size of the surface portion is not larger than 5 times the size of the attachment surface. According to a further embodiment, the size of the surface portion is not larger than 2 times the size of the attachment surface. According to a further embodiment, the size of the surface portion is preferably not larger than 1.2 times the size of the attachment surface.

According to an embodiment, the size of the surface portion is a maximum width of the surface portion and the size of the attachment surface is a maximum width of the attachment surface. According to a further embodiment, the size of the surface portion and the size of the attachment surface are measured along a common line (common when the attachment surface is attached to the surface portion. In such an embodiment the size of the surface portion and the size of the attachment surface are referred to as corresponding to each other. According to an embodiment, the size of the surface portion is not larger than 10 (or, in respective other embodiments 5/2/1.2) times the corresponding size of the attachment surface, in particular in any direction.

According to an embodiment, the size of the surface portion is an area defined by a maximum width of the surface portion in a first direction times a maximum breadth of the surface portion in a second direction, which is perpendicular to the first direction, and the size of the attachment surface is an area defined by a maximum width of the attachment surface in the first direction times a maximum breadth of the attachment surface in the second direction.

According to another embodiment, the size of the surface portion is the extent of the surface portion and the size of the attachment surface is the extent of the attachment surface (which is defined in the same way as the extent of the surface portion).

According to an embodiment, during cleaning the laser beam treats the surface portion under an angle between 20 and 80°, preferably between 30° and 70° wherein the angle is measured between the laser beam and the surface portion. Treating (cleaning) the surface portion with the laser beam under an angle has the advantage that the laser optics is not too much subjected to debris which is removed from the surface of the tire by the laser beam.

It is noted that in particular the above-mentioned embodiments relating to the size of the attachment surface and the size of the surface portion (or to the respective ratio of these two quantities) are in accordance with the fourth aspect of the herein disclosed subject matter.

According to a further embodiment, between a processing head of the laser device and the surface portion a gas flow of more than a predetermined velocity is applied. According to an embodiment, the predetermined velocity is 10 m/s, or is preferably 20 m/s. According to a further embodiment the gas flow between a processing head and the surface portion is bigger than (predetermined velocity)×(1+cos(alpha)) wherein alpha defines the angle between the direction of the gas flow and the direction of the laser beam.

According to an embodiment, for cleaning of the surface portion a laser beam with the following characteristics is used: pulse duration: 10 nanoseconds-150 nanoseconds; fluence: 1-3 Joule/square centimeter ($J/cm^2$); wavelength: approximately 1 micrometer (YAG laser); beam quality: $M^2=2$ or worse; pulse overlap (overlap of subsequent pulses in a line): 50% to 75%; line overlap (overlap of neighboring lines): 50% to 75%. According to an embodiment, the geometry of the laser spot is rectangular.

According to an embodiment, a square and/or a Top Head laser spot with a beam quality $M^2>2$, preferably $M^2>5$ is used.

According to an embodiment, during cleaning of the surface portion opposing bead portions of the tire in the vicinity of the surface portion are spread. In this way the space between the opposing bead portions is increased and that therefore the operating range for the cleaning device is increased.

According to an embodiment also for laser engraving a YAG laser with the same pulse duration, fluence and wavelength as described above for the cleaning operation may be used. According to another embodiment for laser engraving carbon dioxide laser is used (wavelength approximately 10 micrometer; continuous wave (cw) mode; beam quality $M^2<1.5$; $1/e^2$ beam diameter: 200 micrometer-600 micrometer).

In accordance with an embodiment of the second aspect, the program element is adapted for, when executed on a processor device, performing the method according to one or more embodiments of the herein disclosed subject matter.

In accordance with an embodiment of the third aspect, the tire processing device is configured for performing the method according one or more embodiments of the herein disclosed subject matter. In particular, the tire processing device may include a control device as described herein, the control device being configured for performing the method according one or more embodiments of the herein disclosed subject matter.

The control device may be implemented by at least one of mechanics, hardware and software. For example, the control device may comprise the processor device and the computer program product according to embodiments of the herein disclosed subject matter, e.g. a memory for storing the program element.

As used herein, reference to a computer program product is intended to be equivalent to a reference to a computer program and/or a computer readable medium containing a program element as described herein, in particular for controlling a processor device to effect and/or coordinate the performance of a method as described herein. According to an embodiment, the processor device is a network node and/or a computer comprising a memory and at least one processor for carrying out instructions defined by the program element.

The computer program may be implemented as computer readable instruction code by use of any suitable programming language, such as, for example, JAVA, C++, C#, etc., and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Any suitable aspect or embodiment of the herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a method of processing a tire, a computer program product, i.e. tire processing device and a tire. It has to be pointed out that of course any combination of features relating to different aspects of the herein disclosed subject matter is also possible. In particular, some features have been or will be described with reference to device type embodiments (e.g. relating to a tire processing device, a control device thereof, or a tire) whereas other features have been or will be described with reference to method type embodiments (e.g. relating to a method or a computer program product). However, a person skilled in the art will gather from the above and the following description that, unless otherwise notified, in addition to any combination of features belonging to one aspect also any combination of features relating to different aspects or embodiments, for example even combinations of features of device type embodiments and features of the method type embodiments are considered to be disclosed with this application. In this regard, it should be understood that any method feature derivable from a corresponding explicitly disclosed device feature should be based on the respective function of the device feature and should not be considered as being limited to device specific elements disclosed in conjunction with the device feature. Further, it should be understood that any device feature derivable from a corresponding explicitly disclosed method feature can be realized based on the respective function described in the method with any suitable device disclosed herein or known in the art.

The aspects and embodiments defined above and further aspects and embodiments of the herein disclosed subject matter are apparent from the examples to be described hereinafter and are explained with reference to the drawings, but to which the invention is not limited. The aforementioned definitions and comments are in particular also valid for the following detailed description and vice versa.

DETAILED DESCRIPTION

Figure 1:
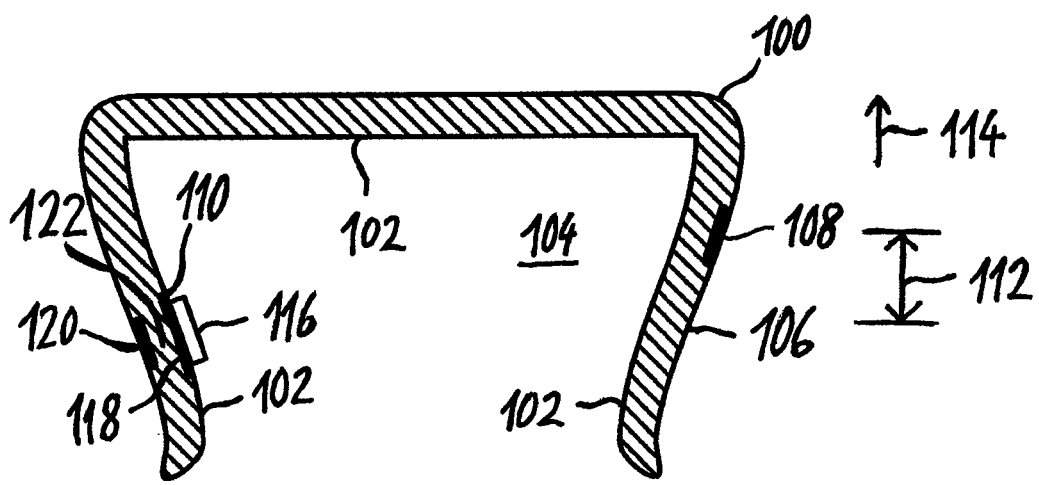
FIG. 1 shows a cross-sectional view of a tire according to embodiments of the herein disclosed subject matter.

The illustration in the drawings is schematic. It is noted that in different figures, similar or identical elements are provided with the same reference signs. Accordingly, the description of the similar or identical features is not repeated in the description of subsequent figures in order to avoid unnecessary repetitions. Rather, it should be understood that the description of these features in the preceding figures is also valid for the subsequent figures unless explicitly noted otherwise.

FIG. 1 shows a cross-sectional view of a tire 100 according to embodiments of the herein disclosed subject matter.

The tire 100 comprises an inner surface 102 defining and facing an inner space 104 of the tire 100. Further, the tire 100 comprises an outer surface 106 pointing away from the inner hollow space 104. Further, the tire comprises an optically visible feature 108, also referred to as first feature, on the outer surface 106, the feature being e.g. a DOT code molded into the tire 100.

In accordance with an embodiment, a surface portion 110 of the inner surface 102 has been cleaned by a cleaning device, preferably by a laser device (not shown in FIG. 1). The surface portion 110 is a portion of the inner surface 102, not the entire inner surface 102. According to an embodiment the area of the cleaned surface portion 110 is less than 5% of the area of the entire inner surface, or, in other embodiments, less than 2%, less than 1% or even less than 0.7%. The cleaned surface portion 110 has a predetermined position (also referred to as first predetermined position) relative to the feature 108 on the outer surface 106. For example, compared to the first feature the cleaned surface portion is (with certain tolerances, e.g. 10 degrees) on the opposite flank and radially spaced by a radial distance 112 from each other in a radial direction 114.

At the cleaned surface portion 110 an electrical device 116 (e.g. an RFID tag) is attached (e.g. by means of an adhesive or by any other suitable means known in the art) to the tire 100. In particular, an attachment surface 118 of the electrical device 116 is attached to the cleaned surface portion 110. In accordance with an embodiment, a size of the cleaned surface portion (e.g. an area over which the cleaned surface portion extends) is not larger than two times a corresponding size of the attachment surface 118 (e.g. the area of the attachment surface 118) of the electrical device 116. In other embodiments, the ratio of the size of the cleaned surface portion over the attachment surface may be different from two (2), e.g. 10, 5, 1.2 or 1. Even ratios smaller than 1 (i.e. in this case the size of the cleaned surface portion 110 is smaller than the corresponding size of attachment surface 118) may be sufficient in some applications.

According to an embodiment, the outer surface 106 of the tire 100 comprises a second feature 120 at a second predetermined position relative to the position of the first feature 108. In accordance with an embodiment, the second feature 120 is laser engraved into the tire. In accordance with a further embodiment, the second predetermined position is opposite the electrical device 116 on a common part 122 of the tire 100 (or at least in the same angular position). In other words, in this embodiment the second feature 120 and the electrical device 116 are on opposite sides of the same, common part 122 of the tire 100. The "same" angular position is an identical angular position within certain tolerances, e.g. angular tolerances specified herein.

In FIG. 1 the surface portion 110, the first feature 108 and the second feature 120 are each visualized with a black line—however this line does not indicate a depth of the first and the second feature 108, 120 or a depth of treatment of the cleaning operation in the surface portion 110 but only serves to visualize the first feature 108, the second feature 120 and the surface portion 110 in the cross sectional view.

Figure 2:
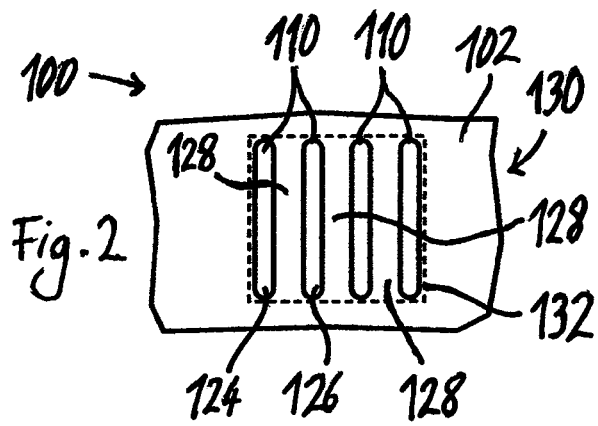
FIG. 2 shows in a plan view a part of the inner surface of the tire of FIG. 1.

FIG. 2 shows in a plan view a part of the inner surface 102 of the tire 100 of FIG. 1. In accordance with an embodiment, the cleaned surface portion 110 comprises two parts 124, 126 (or more parts, e.g. four parts as shown in FIG. 2) which are spaced from each other by an uncleaned surface 128. The two parts 124, 126 may be separate parts, as shown in FIG. 2. According to other embodiments, the two parts may be connected parts of a continuous surface portion 110 (not shown in FIG. 2). In accordance with an embodiment, the surface portion 110 is provided in the shape of a pattern, e.g. a line pattern 130. According to an embodiment, the line pattern 130 comprises a set of parallel lines 124, 128 (e.g. four parallel lines as shown in FIG. 2) which are separated from each other by parts of the uncleaned surface 128.

In accordance with an embodiment, the pattern of the cleaned surface portion 110 extends over a first area, indicated with the dashed line 132 in FIG. 2. In accordance with an embodiment, a second area of the cleaned surface portion 110 itself is smaller than the first area 132. For example, according to an embodiment the second area is about 50% of the first area, as shown in FIG. 2. By a cleaning only part of the extent 132 of the surface portion 110, the processing time for laser cleaning of the surface portion 110 cleaning can be reduced.

Figure 3:
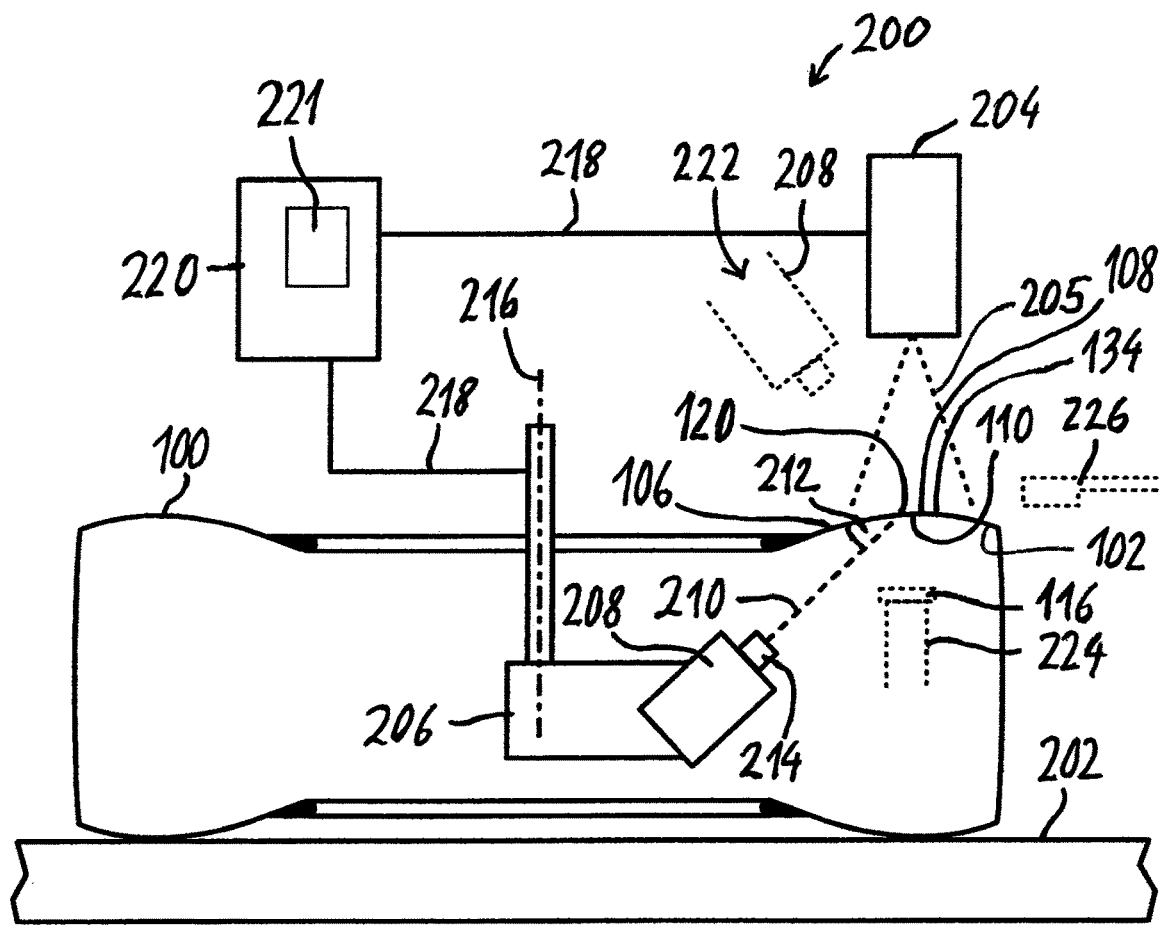
FIG. 3 shows a side view of a tire processing device according to embodiments of the herein disclosed subject matter.

FIG. 3 shows a side view of a tire processing device 200 according to embodiments of the herein disclosed subject matter.

The tire processing system 200 is capable of manufacturing a tire according to embodiments of the herein disclosed subject matter, e.g. a tire shown in FIG. 1 and FIG. 2.

The tire processing device 200 comprises a tire positioning device 202 for transporting and positioning of a tire 100.

The tire processing device 200 further comprises a sensor 204 e.g. in the form of a sheet of light sensor which is configured for illuminating the outer surface 106 of the tire 100 with a sheet of light 205 in order to capture a height profile of the outer surface 106 (e.g. of a flank 134) of the tire 100 which is opposite the sensor 204. The sensor 204 is configured for identifying the position of the first feature 108 on the outer surface 106 of the tire 100. According to an embodiment, the sensor 204 is movable (e.g. rotatable) in order to move the sensor 204 over the outer surface 106 of the tire and to identify the position of the first feature 108.

Further, the tire processing device 200 comprises a laser device 206 for cleaning the surface portion 110 of the inner surface 102 of the tire. In accordance with an embodiment, the laser device 206 comprises a processing head 208 which according to a further embodiment is capable of emitting a laser beam 210 for cleaning the surface portion 110. In accordance with an embodiment, the laser beam 210 or the laser beam path thereof forms an angle 212 with the inner surface 102 of the tire 100. In this way, an optical system 214 of the processing head 208 is less affected by debris sputtered by the laser beam 210 from the inner surface 102.

According to an embodiment, the laser device 206 is rotatable about an axis 216. In accordance with a further embodiment, the laser device 206 and the sensor 204 are communicatively coupled, indicated at the 218, with a control device 220 of the tire processing device 200. Communicative coupling 218 may be performed wireless or wired, depending on the actual implementation of the tire processing device. According to a further embodiment, the control device 220 is also configured for controlling the positioning device 202.

According to an embodiment, the control device 220 controls the positioning device 202 so as to align a tire axis of rotation (not shown in FIG. 3) of the tire 100 with the axis of rotation 216 of the laser device 206. By a rotating the processing head 208 about the axis of rotation 216 the processing head 208 can be positioned at any desired angular position with regard to the first feature 108 of the tire 100. According to an embodiment scanning the laser beam over the surface portion 110, which is to be cleaned, is performed by the optical system 214 of the laser beam. However, in another embodiment further actuators are provided for moving the processing head 208 so as to move the laser beam 210 over the surface portion 110 which is to be cleaned.

According to an embodiment, the processing head 208 of the laser device 206 is vertically movable so as to allow to position the processing head 208 in a further position 222 which allows laser engraving of a second feature 120 on the outer surface 106 of the tire 100. According to an embodiment, the tire is not moved (i.e. the positioning device 202 is not operated) between the cleaning the surface portion 110 of the inner surface 102 and the laser engraving of the second feature 120 on the outer surface 106. Thus a further identification of the position of the first feature 108 before the engraving of the second feature 120 is not necessary.

According to an embodiment, the cleaning operation and the engraving operation is performed by the same laser device 206. According to another embodiment, two different devices, e.g. two different laser devices may be provided, a first laser device for the cleaning operation and a second laser device for the engraving operation. While the two different laser devices may be operated subsequently or with the time overlap in their operation, according to a further embodiment the two different laser devices are provided at different stations of the tire processing device.

According to an embodiment, the tire processing device 200 comprises a mounting device 224 which is provided for attaching an electrical device 116 to the surface portion 110 after the surface portion 110 is cleaned by the laser device 206. According to an embodiment, the mounting device 224 comprises an actuator for moving the electrical device 116 to the surface portion 110 for attachment of the electrical device 116 to the surface portion 110.

According to an embodiment, the tire processing device 200 comprises a transducer 226 which is movable (e.g. by means of an actuator) into vicinity of the electrical device 116 attached to the surface portion 110 in order to exchange data with the electrical device 116, e.g. with a memory (not shown in FIG. 3) of the electrical device 116. The mounting device 224 and the transducer 226 may be provided in the same station in which also the laser device 206 is provided. In a further embodiment, at least one of the mounting device 224 and the transducer 226 is provided in a further station of the tire processing device 200.

In accordance with an embodiment, the control device 220 controls the operation of the mounting device 224 and the operation (movement and data transfer) of the transducer 226 in accordance with embodiments of the herein disclosed subject matter.

According to an embodiment, the control device 220 comprises a processor device 221 which is configured for executing a program element according to embodiments of the herein disclosed subject matter, thereby carrying out the method according to embodiments of the herein disclosed subject matter. According to an embodiment, the control device 220 is a computer programmed with the program element.

Figure 4:
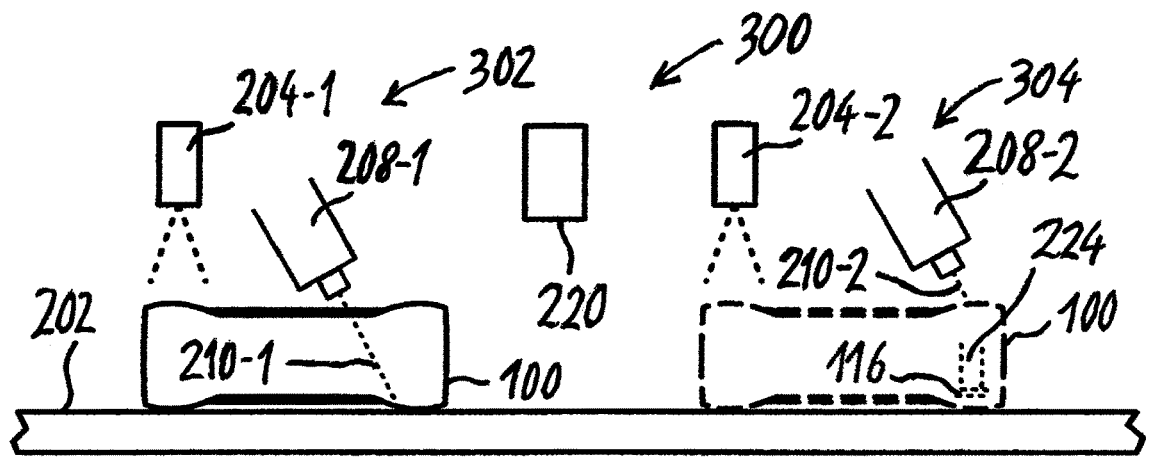
FIG. 4 shows a further tire processing device according to embodiments of the herein disclosed subject matter.

FIG. 4 shows a further tire processing device 300 according to embodiments of the herein disclosed subject matter.

According to an embodiment, the tire processing device 300 comprises at least two stations for processing of tires of which two stations, a first station 302 and a second station 304 are shown in FIG. 4.

The tire processing device 300 is similar to the tire processing device 200 except that some operations, which are performed in a single station of the tire processing device 200, are performed in two different stations 302, 304 in the tire processing device 300. According to an embodiment, the tire processing device 300 comprises a common control device 220 for controlling individual devices of the tire processing device, in particular for controlling devices of the first station 302 and the second station 304.

In accordance with an embodiment, the first station 302 comprises a sensor 204-1 which may be similar or identical to the light sheet sensor 204 described with regard to FIG. 3. Further, the first station comprises a first laser device with a processing head 208-1 for cleaning the inner surface portion of the tire 100, which is positioned in the first station 302, with a laser beam 210-1 in accordance with embodiments of the herein disclosed subject matter.

In accordance with an embodiment, the tire processing device 300 comprises a positioning device 202 for transporting the tire 100 through the tire processing device 300 and in particular for transporting a tire 100 to the first station 302 and, subsequently, to the second station 304. Although a single positioning device is shown in FIG. 4, it should be understood that two or more subsequent positioning devices (or other transport devices) may be provided instead of the positioning device 202. After the cleaning of the surface portion of the inner surface of the tire 100 in the first station 302 is completed, the control device 220 operates the positioning device 202 so as to transport the tire 100 into the second station 304. In the second station 304, the tire 100 is shown in dashed lines, since the tire 100 is located in the second station at the later point in time. While in FIG. 4 the same tire 100 is shown in the first station 302 and (at a later point in time and therefore in dashed lines) in the second station 302, it should be understood that generally two different tires may be processed simultaneously in the first station 302 and the second station 304.

In accordance with an embodiment, the second station 304 comprises a second sensor 204-2 for again identifying the position of the first feature of the tire 100. By again identifying the position of the first feature of the tire 100 the position of the first feature (and of the entire tire) in the second station 304 is known, even if the position of the tire 100 is not traced (or not sufficiently traced) during the movement of the tire 100 from the first station 302 to the second station 304.

In accordance with an embodiment, the second station 304 further comprises the mounting device 224 for mounting a transducer 116 to the cleaned surface portion of the inner surface of the tire 100, as already described with regard to FIG. 3. Further, the second station 304 comprises, in accordance with an embodiment, a processing head 208-2 of a further (second) laser device which is provided for engraving the second feature on the outer surface of the tire 100 with a laser beam 210-2. In an alternative implementation the engraving of the second feature may be performed in the first station 302 (e.g. with the first laser device (head 208-1)) while the mounting of the transducer is performed in the second station 304.

Figure 5:
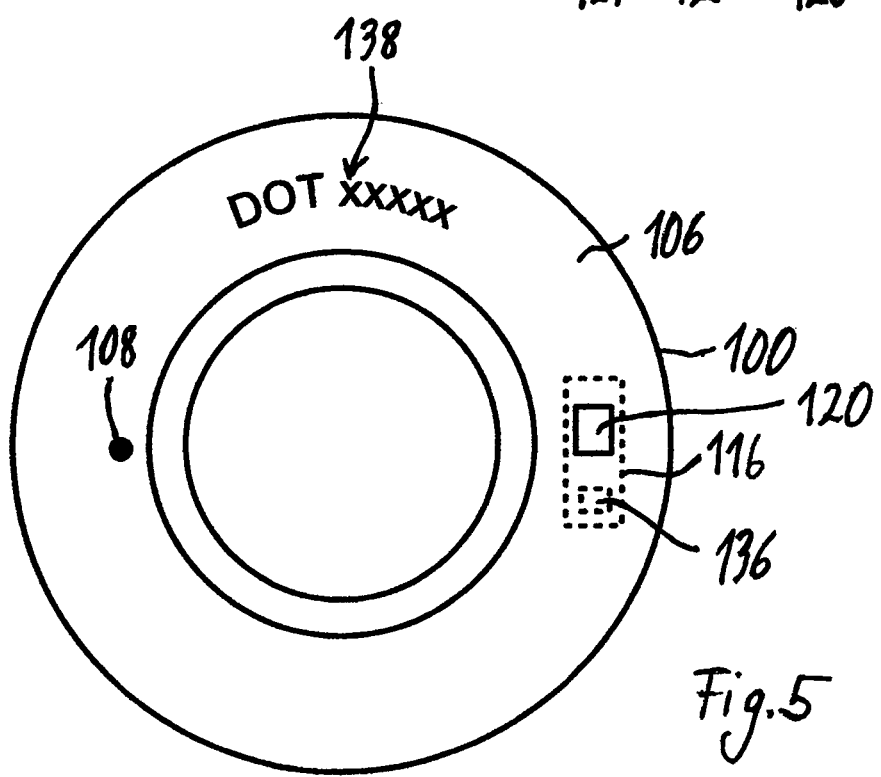
FIG. 5 shows a side view of a tire according to embodiments of the herein disclosed subject matter.

FIG. 5 shows a side view of a tire 100 according to embodiments of the herein disclosed subject matter. According to an embodiment, the first feature 108 is a tire uniformity point and the second feature 120 indicates the location of an electrical device 116 (shown in dashed lines in FIG. 5) which is located diametrically opposite the tire uniformity point 108 on the inner surface of the tire 100. In accordance with an embodiment, the electrical device 116 comprises a memory 136 for storing tire related information, e.g. the weekly code of a DOT code 138 which has been molded into the outer surface 106 of the tire 100. According to an embodiment, the weekly code is read from the outer surface of the tire by a sensor, e.g. the sensor 204 described with regard to FIG. 3. According to an embodiment, the control device of the tire processing device (e.g. the control device 220 of FIG. 3) is configured for operating the transducer 226 (e.g. the transducer 226 of FIG. 3) so as to store the weekly code read from the tire in the memory 136 of the electrical device 116. Optionally and in accordance with a further embodiment the a device serial number of the electrical device 116 may be read by the control device via the transducer and the tire related information may be stored with the associated device serial number in the memory 136 of the electrical device 116 or in an external memory, e.g. in a memory associated with the tire processing device 200.

In another embodiment, the weekly code is stored in the memory 136 of the electrical device 116 prior to the attachment of the electrical device 116 to the surface portion. In such a case the control device may be configured for reading the weekly code from the memory 136. Further, the control device 116 may be configured for operating the laser device (e.g. the laser device 206 of FIG. 3) so as to engrave the weekly code (e.g. as the second feature) into the outer surface 106 of the tire by means of laser engraving.

It should be noted that any entity disclosed herein (e.g. components, elements and devices) are not limited to a dedicated entity as described in some embodiments. Rather, the herein disclosed subject matter may be implemented in various ways and with various granularity on device level or software module level while still providing the specified functionality. Further, it should be noted that according to embodiments a separate entity (e.g. a software module, a hardware module or a hybrid module (combined software/hardware module)) may be provided for each of the functions disclosed herein. According to other embodiments, an entity (e.g. a software module, a hardware module or a hybrid module) is configured for providing two or more functions as disclosed herein. According to still other embodiments, two or more entities are configured for providing together a function as disclosed herein.

Further, although some embodiments refer to specific entities, e.g. an electrical device, it should be understood that each of these references is considered to implicitly disclose in addition a respective reference to the corresponding general term (e.g. a separate element). Also other terms which relate to specific techniques are considered to implicitly disclose the respective general term with the specified functionality.

Further, it should be noted that while the exemplary tire and tire processing devices in the drawings comprise a particular combination of several embodiments of the herein disclosed subject matter, any other combination of embodiment is also possible and is considered to be disclosed with this application and hence the scope of the herein disclosed subject matter extends to all alternative combinations of two or more of the individual features mentioned or evident from the text. All of these different combinations constitute various alternative examples of the invention.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate some of the above described embodiments of the present invention one can state:

A tire 100 comprises an inner surface 102 defining and facing an inner hollow space 104, an outer surface 106 pointing away from the inner hollow space 104. A method of processing the tire 100 comprises identifying the position of a first feature 108 on the outer surface 106 and cleaning a surface portion 110 of the inner surface 102 of the tire 100, wherein the surface portion 110 has a first predetermined position relative to the position of the first feature 108 on the outer surface 106. A separate element is attached with its attachment surface 118 to the surface portion 110, wherein a ratio of a size of the surface portion 110 over a corresponding size of the attachment surface 118 is smaller than 10.

The invention claimed is:

1. A method of processing a tire, the tire comprising an inner surface defining and facing an inner hollow space, and an outer surface of a flank pointing away from the inner hollow space, the method comprising:
    identifying a first predetermined position of a surface portion of the inner surface by identifying a position of a first feature on the outer surface with a sensor and a knowledge of a predetermined spatial relationship between the position of the first feature and a desired position of the surface portion on the inner surface of the tire; and
    cleaning of a surface portion of the inner surface of the tire, the surface portion having the first predetermined position relative to the position of the first feature on the outer surface;
    wherein the predetermined spatial relationship includes a radial position and an angular position on the tire.

2. The method according to claim 1, further comprising engraving of a second feature on the outer surface at a second predetermined position relative to the position of the first feature on the outer surface.

3. The method according to claim 1, further comprising attaching an attachment surface of a separate element at the surface portion after cleaning the surface portion.

4. The method according to claim 3, wherein the separate element comprises an electrical device, the electrical device comprises a readable device serial number, the method further comprising:
    reading the device serial number of the electrical device;
    reading tire related information from the tire; and
    storing a data record on a storage device, the data record associating the device serial number and the tire related information.

5. The method according to claim 1, wherein identifying the position of the first feature or any other feature of the tire is performed only once.

6. The method according to claim 3, further comprising:
    engraving of a second feature on the outer surface at a second predetermined position relative to the position of the first feature on the outer surface;
    the method comprising as further processing steps at least one of the attaching of the separate element and the engraving of the second feature wherein at least one of the further processing steps of attaching and engraving comprises (a) identifying the position of a third feature on the outer surface of the tire and (b) performing at least one further processing step depending on a position of the third feature.

7. The method according to claim 1, wherein the cleaning of the surface portion is performed with a laser beam.

8. The method according to claim 1, wherein a size of the surface portion is not larger than 10 times a size of the attachment surface of an electrical device.

9. The method according to claim 1, wherein the surface portion comprises two parts which are spaced from each other by an uncleaned surface.

10. The method according to claim 2, wherein the second feature and the surface portion are being provided in the same angular position of the tire.

11. The method according to claim 10, wherein a separate element comprises an electrical device, the electrical device comprises a readable device serial number, the method further comprising:

reading the device serial number of the electrical device;
  reading tire related information from the tire;
  storing a data record on a storage device, the data record associating the device serial number and the tire related information; and
  wherein the storage device is part of the electrical device being attached on the inner surface of the tire and wherein the tire related information comprises at least one of a tire serial number and a production week of the tire.

12. A computer program product in the form of a non-transitory computer readable medium containing a program element, the program element being on a processor device and performing the method of claim 1.

13. A tire processing device comprising:
  a cleaning device;
  a positioning device; and
  a processing device configured to perform the method of claim 1.

* * * * *